(12) United States Patent
Roman (10) Patent No.: US 7,397,851 B2
(45) Date of Patent: Jul. 8, 2008

(54) SEPARATE PLANE COMPRESSION

(76) Inventor: Kendyl A. Roman, 730 Bantry Ct., Sunnyvale, CA (US) 94087-3402

( * ) Notice: Subject to any disclaimer, the term of this patent is extended or adjusted under 35 U.S.C. 154(b) by 535 days.

(21) Appl. No.: 10/144,546

(22) Filed: May 10, 2002

(65) Prior Publication Data

US 2002/0196848 A1    Dec. 26, 2002

Related U.S. Application Data

(60) Provisional application No. 60/290,523, filed on May 10, 2001.

(51) Int. Cl.
   *H04N 7/12* (2006.01)
(52) U.S. Cl. .............. 375/240.01; 375/240; 375/240.12
(58) Field of Classification Search ................. 375/240, 375/240.01, 240.12; 345/156; 382/173
   See application file for complete search history.

(56) References Cited

U.S. PATENT DOCUMENTS

| | | | |
|---|---|---|---|
| 5,271,072 A | 12/1993 | Yoshida et al. ................ 382/56 |
| 6,091,777 A | 7/2000 | Guetz et al. .................. 375/240 |
| 6,414,991 B1 * | 7/2002 | Yagasaki et al. ........ 375/240.12 |
| 6,608,928 B1 * | 8/2003 | Queiroz ...................... 382/173 |
| 6,801,188 B2 * | 10/2004 | Longobardi ................. 345/156 |

* cited by examiner

*Primary Examiner*—Allen Wong

(57) ABSTRACT

A method of distinguishing between regions of an image, separating and masking the original image into multiple image planes, and compressing each separated image plane with a compression method that is optimal for its characteristics. From a video stream, separate image streams can be compressed with different methods, and the separate image streams can be stored or transmitted at different rates. Alternatively, frame differencing can be applied to the separated streams.

One method of distinguishing the region of interest is use of an input device to allow the viewer or broadcaster to dynamically select the shape, size, or position of the region.

An alternate method of distinguishing the regions of interest is automated analysis of the characteristics of various regions of an image.

21 Claims, 5 Drawing Sheets

SEPARATE PLANE COMPRESSION

RELATED APPLICATIONS

This application claims a priority filing date based on Provisional Patent Application Ser. No. 60/290,523, filed 2001 May 10, entitled "SEPARATE PLANE COMPRESSION", the subject matter of which is incorporated herein by reference. Any provisional claims are specifically excluded from this application.

U.S. patent application Ser. No. 09/433,978, filed on 1999 Nov. 11, and entitled "GRAPHICAL USER INTERFACE INCLUDING CONTROL BOX REPRESENTING IMAGE AND MAGNIFICATION OF IMAGE", is wholly owned by the inventor of the present invention.

The following applications by the same inventor are referenced in this application by the terms "ZLN" and "ZLD", respectively, but no claim of priority is made, because this application discloses a separate invention:

U.S. patent application Ser. No. 09/467,721, filed on 1999 Dec. 20, and entitled "VARIABLE GENERAL PURPOSE COMPRESSION FOR VIDEO IMAGES (ZLN)", which claims a priority date based on U.S. provisional application 60/113,051, filed on 1998 Dec. 21.

U.S. patent application Ser. No. 09/473,190, filed on 1999 Dec. 21, and entitled "ADDING DOPPLER ENHANCEMENT TO GRAYSCALE COMPRESSION (ZLD)", which claims a priority date based on U.S. provisional application 60/113,050, filed on 1998 Dec. 21.

BACKGROUND

1. Field of the Invention

This invention relates to data compression, specifically to the compression and decompression of video images that contain portions that can be separated from other portions to optimize compression, storage, or transmission.

2. Description of Prior Art

Moving Pictures

A video or movie is comprised of a series of still images that, when displayed in sequence, appear to the human eye as a live motion image. Each still image is called a frame. Television in the USA displays frames at the rate of 30 frames per second. Theater motion pictures are displayed at 24 frames per second. Cartoon animation is typically displayed at 8-12 frames per second.

Compression Methods

The ZLN and ZLD methods are effective ways to compress video images. Other compression algorithms are known in the prior art, including RLE, GIF (LZW), MPEG, Cinepak, Motion-JPEG, Sorensen, Fractal, and many others.

Each of these methods treats a frame of video as a basic unit of compression applying the compression method uniformly to the entire image.

Color Plane Separation

It is well known in the art that an image can be uniformly separated into color planes based on the red, green, and blue components values for each pixel, based on hue, saturation, and brightness component values for each pixel, or based on ink colors, such as cyan, yellow, magenta, and black. However these color plane separations are not done to reduce data size or to aid compression. They are used to facilitate the display (such as on a RGB or YUV computer monitor) or the printing of the image (for example, four-color printing).

Frame Differencing

MPEG and some other compression methods compare adjacent frames in a stream of frames. Under certain circumstances these methods send only a subset of a frame (namely a rectangular portion that contains a change when compared to the adjacent frame) which is then overlaid on the unchanged data for the adjacent frame.

Doppler Enhancement

Doppler techniques are used to determine the velocities of one or more small objects. Some common uses of Doppler techniques include without limitation:

1. Radar used to detect rain

2. Radar used to determine speed of vehicles or aircraft

3. Ultrasound blood flow analysis

Doppler velocity scales are often incorporated with grayscale images.

In the case of ultrasound blood flow analysis, average velocities toward the sensing probe are encoded as a shade of red and velocities away from the sensing probe are encoded as a shade of blue. Although the image appears to be in color, there are really three monochromic values: a grayscale, a red scale, and a blue scale. The base image plane (grayscale ultrasound) is generated more often (typically 15-30 frames per second) than the overlay plane showing the Doppler red and blue scales (typically 3-10 frames per second).

In the case of rain, the base map of the earth is generated only once and the Doppler colors that indicate the intensity of the precipitation are laid over the base map.

SUMMARY OF THE INVENTION

The present invention teaches that, often in a video stream, a small region of the image is of greater interest to the viewer, or recipient, of the video stream. The region of interest is required at a high quality and high frame rate. The portion of the image that is not of primary interest is still important for reference and orientation and still needs to be displayed but can be displayed at lower quality and at lower frame rate. Said portion is necessary so that the viewer can know when to change the focus to a new region of interest.

The present invention also teaches that, in some cases, separate regions are of similar or equal interest, but, because of distinct characteristics, the image can be separated into multiple regions that can be separated into planes. Upon separation the planes are compressed with a method optimal to the distinguishing characteristics of each plane, and transferred at a rate optimal to each compressed plane.

In accordance with the present invention, a method of distinguishing between regions of an image, separating and masking the original image into multiple image planes, and compressing each separated image plane with a compression method that is optimal for its characteristics. From a video stream, separate image streams can be stored or transmitted at different rates. Alternatively, frame differencing can be applied to the separated streams.

One method of distinguishing the region of interest is use of an input device to allow the viewer or broadcaster to dynamically select the shape, size, or position of the region.

Another method of distinguishing the region of interest is to automatically compare adjacent frames and select a subset region that contains the largest change. For example, analysis of a video of a sprinter would show that the leg and arm positions of the athlete are the biggest change. The torso, and perhaps the head, may remain fairly stable. An automatic analysis of adjacent video frames would detect that the regions containing the legs and arms were of greatest change.

Those areas could be automatically selected as the region of greatest interest for applying the methods of the present invention.

In some cases, the area of interest is encoded and compressed such that image quality remains high and is transmitted and displayed more frequently. The unselected area, which is important for reference and orientation, is encoded, compressed, and transmitted at a lower quality, resolution, and frame rate. The viewer or broadcaster can change the area of focus to get more detail if the area outside the current area of focus becomes interesting. If a frame has to be dropped to maintain transmission frame rate, the plane of less quality will be dropped before frames from the more important plane, thus allowing for more bandwidth for the selected area of interest.

In some cases, a video image will contain a marker that can easily be detected by analysis of the video. For example, in a baseball game, generally, any area of the image surrounded by grass or dirt is more important that the sky or stadium. The grass and dirt can be detected as a marker and the regions substantially enclosed by those markers, namely the ball, bat, and players, can be automatically distinguished as the regions of greater interest. Also, for example, in a weather map video being broadcast to the San Francisco Bay Area audience, the region of the map corresponding to Northern California can easily be detected and that portion of the video can automatically be distinguished as the region of greater interest.

OBJECTS AND ADVANTAGES

Accordingly, beside the objects and advantages of the method described above, some additional objects and advantages of the present invention are:
1. to provide efficient encoding for video images that contain distinguishable regions.
2. to reduce the size of an encoded data representing a video stream.
3. to reduce the bandwidth required to transmit an encoded video stream.
4. to provide efficient encoding of Doppler enhanced images.
5. to reduce the size of encoded data buffers that contains Doppler enhancement.
6. to provide user control of the region selection and compression methods.
7. to automatically detect selection regions by detecting viewer eye movements.
8. to automatically detect selection regions by comparing areas of change.
9. to automatically detect selection regions by detecting markers in the image.

DRAWING FIGURES

In the drawings, closely related figures have the same number but different alphabetic suffixes.

| Reference Numerals in Drawings | |
|---|---|
| 100 | original image |
| 102 | grayscale region |
| 104 | grayscale triangle |
| 110 | red oval |
| 112 | blue circle |
| 115 | first path |
| 120 | first plane |
| 125 | second path |
| 130 | second plane |
| 140 | first compression method |
| 145 | second compression method |
| 150 | first encoded data |
| 155 | second encoded data |
| 160 | composite buffer |
| 170 | first decompression method |
| 175 | second decompression method |
| 180 | first decoded image |
| 185 | second decoded image |
| 190 | copy path |
| 195 | overlay path |
| 199 | combined image |
| 200 | entry point |
| 202 | path 202 |
| 204 | get pixel step |
| 206 | path 206 |
| 208 | which plane decision |
| 210 | path 210 |
| 212 | add to first buffer step |
| 214 | path 214 |
| 216 | put mask in second buffer step |
| 320 | third transfer |
| 321 | fourth original image |
| 322 | fourth first plane |
| 323 | forth second plane |
| 325 | forth first decoded image |
| 326 | reuse of third decoded image |
| 327 | fourth combined image |
| 330 | fourth transfer |
| 340 | fifth transfer |
| 350 | sixth transfer |
| 380 | input video stream |
| 390 | output video stream |
| 400 | user input |
| 405 | user input path |
| 410 | display generator |
| 415 | image source path |
| 420 | image source |
| 218 | path 218 |
| 220 | path 220 |
| 222 | add to second buffer step |
| 224 | path 224 |
| 226 | put mask in first buffer step |
| 228 | path 228 |
| 230 | increment buffer pointers step |
| 232 | path 232 |
| 240 | done decision |
| 250 | path 250 |
| 260 | path 260 |
| 262 | compress first buffer step |
| 264 | path 264 |
| 266 | compress second buffer step |
| 268 | path 268 |
| 270 | exit point |
| 300 | first transfer |
| 301 | second original image |
| 302 | second first plane |
| 303 | second second plane |
| 305 | second first decoded image |
| 306 | reuse of second decoded image |
| 307 | second combined image |
| 310 | first transfer |
| 311 | third original image |
| 312 | third first plane |
| 313 | third second plane |
| 315 | third first decoded image |
| 316 | third second decoded image |
| 317 | third combined image |

-continued

| | Reference Numerals in Drawings |
|---|---|
| 425 | display path |
| 430 | display |
| 435 | control data path |
| 440 | control data |
| 450 | bust region |
| 460 | background region |
| 470 | oval region |
| 480 | outer region |
| 482 | inner region |
| 484 | hair region |
| 485 | face region |
| 486 | coat region |
| 487 | shirt region |
| 488 | tie region |
| 490 | rectangular region |
| 499 | combined region |

SPECIAL DEFINITIONS plane—a image containing pixels selected from the original image based on their distinguishing characteristics and containing mask pixels holding the place of unselected pixels.

mask value—a uniform pixel value, typically black (all zeros) or white (all ones), used to indicated that the position in the pixel map is to be processed differently.

mask—a region comprising a collection of mask values.

DESCRIPTION OF THE INVENTION

Distinguishable Characteristics

Most video images contain regions that are distinguishable from the other pixels that make up an image. Sometimes the distinguishing characteristic is the importance of the region to the viewer. In video conferencing, for example, the face region may be of most importance to the viewer. In medical imaging such as ultrasound, the generated image in the center of the display may be of most importance to the viewer. Sometimes the distinguishing characteristic is the compressibility of the regions. Sometimes the distinguishing characteristic is the color depth of the regions. Sometimes the distinguishing characteristic is the rate of change of the regions. Other distinguishing characteristics, such as markers, have been mentioned above.

The following are additional examples of distinguishable characteristics.

When watching a sporting event the motion of the players or the ball is much more important than the playing surface or the background audience. If the region of interest is generally distinguishable based on color range, brightness range, or position on the screen, those regions could be updated more quickly or compressed with more detail while the remaining regions of less importance are compressed or displayed in a way that requires less resources.

When watching a news broadcast or interview the region of the "talking head" or a graphic display may be the region of most interest to viewers.

A region of solid color or grayscale value compresses more efficiently than a series of varying values. This is true of the ZLN compression method. If the regions are distinguished based on their compressibility, different compression methods can be applied to each region.

Grayscale pixel values can be stored in 8 bits while the corresponding quality of color pixel is often stored in 24 or 32 bits. If the regions are distinguished based on their storage requirements (also known as color depth, or bit depth), a significant space or bandwidth saving can be made.

A Doppler enhanced image such as a weather map or an ultrasound medical image is synthesized by the Doppler circuitry. In the case of a weather map, the underlying image does not change but the Doppler enhanced velocity scales do change from frame to frame. In the case of Doppler enhanced ultrasound image, the underlying grayscale ultrasound image changes more frequently than the circuitry can calculate and display the Doppler information. If the Doppler and non-Doppler regions are processed separately the overall effective compression sizes and transmission times can be reduced.

Plane Separation

The present invention teaches that by separating each distinguishable region of a video frame into separate planes and applying different compression methods that are optimal for each resulting plane, the overall effective compression and transmission speeds can be increased.

Figure 1A:
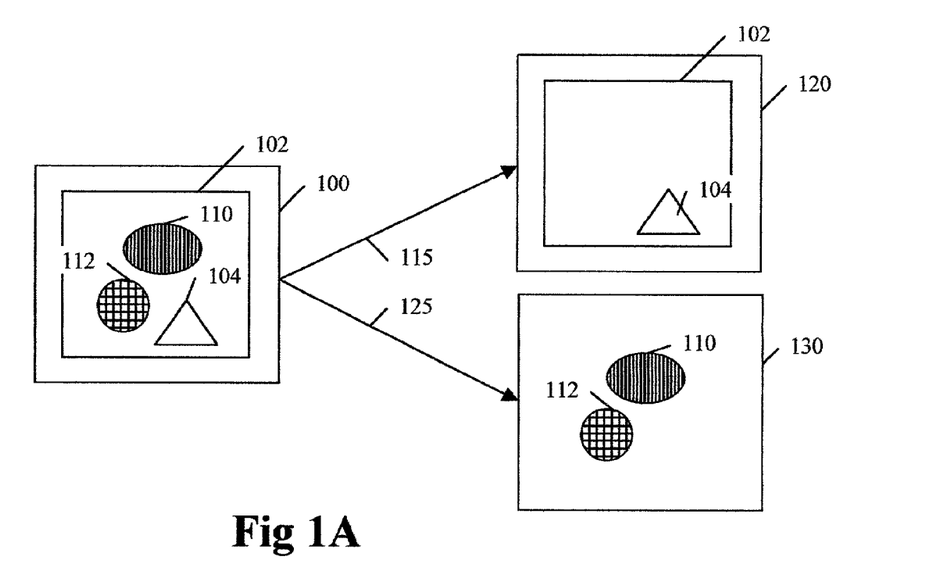
FIG. 1A shows an example of image separation.

FIG. 1A

FIG. 1A shows an example of an original image 100. In this simple example, the image is comprised of a grayscale region 102 that contains a grayscale triangle 104, a red oval 110 and a blue circle 112. The red oval 110 and the blue circle 112 are distinguishable from the rest of the image because their red, green, and blue component values are different and need to be stored in 24 (or 32) bits. The remaining region has equivalent values in the red, green, and blue component values for each pixel and therefore can be reduced to 8 bits and still maintain the full quality. In this example, the grayscale pixels are separated along a first path 115 to a first plane 120, and the color pixels from the red oval 110 and the blue circle 112 are separated along a second path 125 to a second plane 130. In the first plane 120, the unselected (e.g. color) pixel locations are filled with a mask value, such as black, leaving a sold region of repeating values that will compress well with a compression method such as ZLN. In the second plane 130, the unselected pixels are filled with a mask value, such as white. The color chosen for the mask value generally does not matter because those pixels are overlaid (in the base plane) or ignored (in the overlay plane) prior to display.

The mask values could be any value that is known to be a mask by the decompressor at decompression time. The mask value can be predetermined or encoded with the compressed plane.

As stated above, the distinguishing characteristic is not limited to grayscale versus color and could vary over time in the same video program. It is also within the scope of this invention to separate the original image 100 into more than two planes.

Figure 1B:
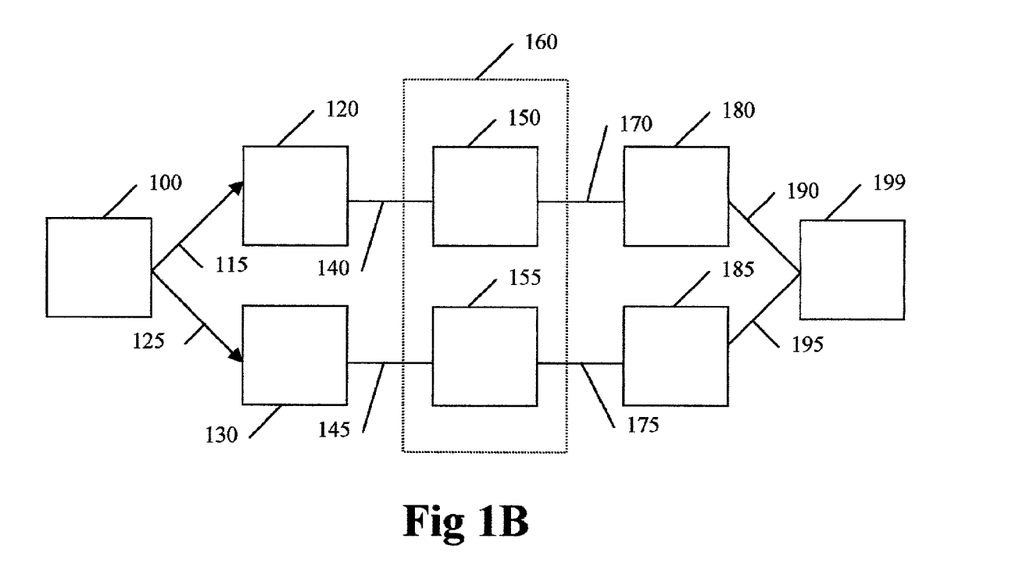
FIG. 1B shows compression and decompression.

FIG. 1B

FIG. 1B illustrates the compression, storage or transmission, decompression, and composition of the separated planes. The original image 100 is separated into two or more planes as explained above. Each plane is then compressed with a compression method that is optimum for its distinguishing characteristics. These compression methods could be: one well known in the art, one of a co-pending patent application, or a current or future proprietary one. The first plane 120 is compressed using a first compression method 140 resulting in a first encoded data 150. The second plane 130 is compressed using a second compression method 145 resulting in a second encoded data 155. The encoded data could be stored in a storage medium such as a computer memory, a hard drive or CD-ROM, or transferred across a network as a part of a video stream. A composite buffer 160 represents either the encoded data on a storage medium or the data being transferred over the network, and may also include audio or textual data associated with the video.

Upon decompression, the first encoded data 150 is decompressed with a first decompression method 170 that corresponds with the first compression method 140, resulting in a first decoded image 180. The second encoded data 155 is decompressed with a second decompression method 175 that corresponds with the second compression method 145, resulting in a second decoded image 185. Typically, the first decoded image 180 is the base image and will be composed along a copy path 190 with the second decoded image 185 along an overlay path 195 which removes the masked pixels and overlays the base image with the remaining pixels to form a combined image 199. Except for effects of the various compression methods, the combined image 199 will be substantially representative of the original image 100.

Figure 2:
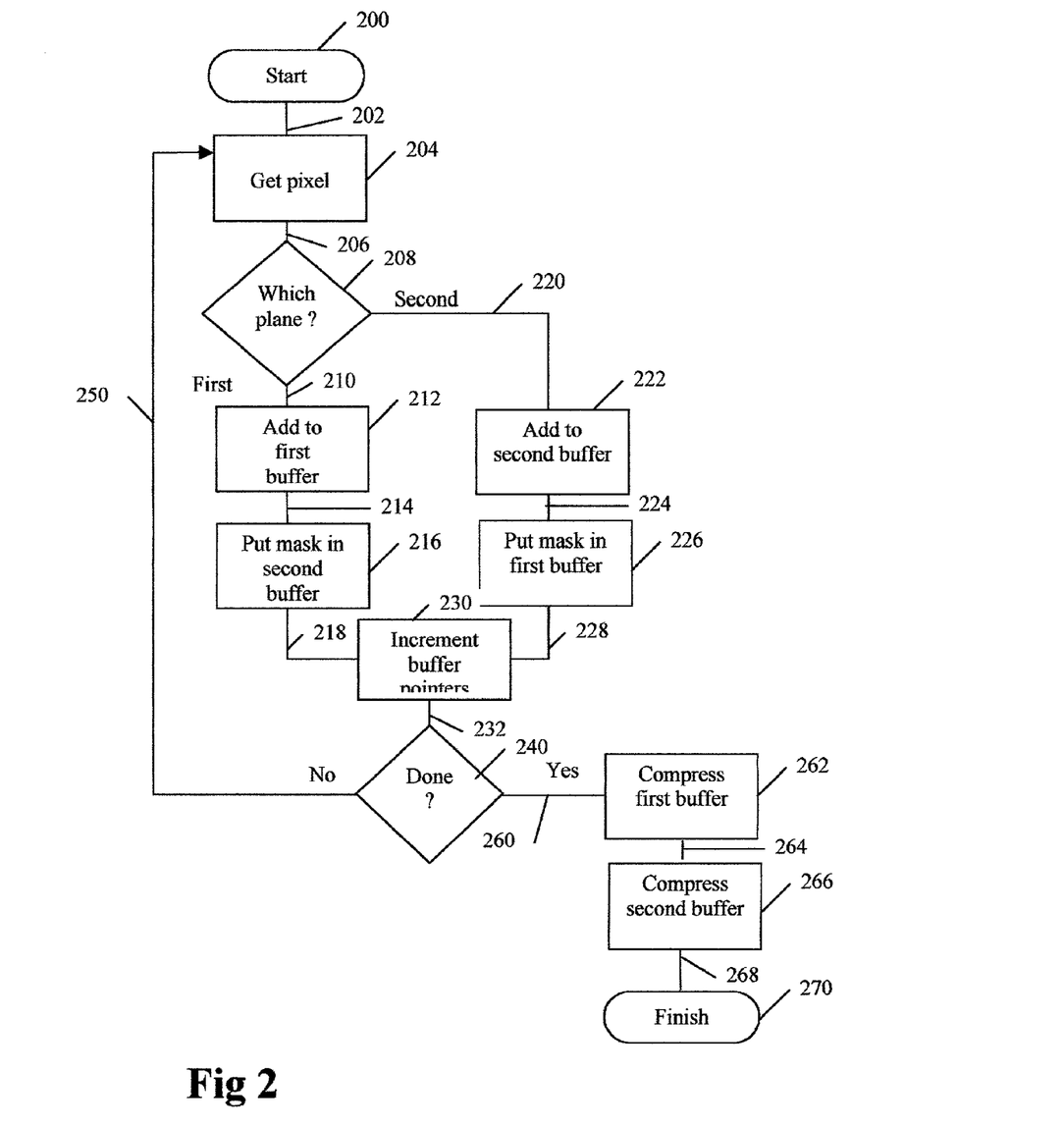
FIG. 2 shows a flow chart of the separation and compression method.

FIG. 2

FIG. 2 shows a flow chart for an embodiment of the method of the present invention. The chart begins at an entry point 200 and continues along path 202 to a "get pixel" step 204 where the next pixel from the original image 100 is obtained. Flow continues along path 206 to a "which plane" decision 208. If the distinguishing characteristic of the current pixel indicates that it should be separated to the first plane, flow continues along path 210 to an "add to first buffer" step 212 where the pixel is added to the first buffer. Flow continues, along path 214, to a "put mask in second buffer" step 216 where the mask value for the second plane is written to the second buffer. Flow continues along path 218 to an "increment buffer pointers" step 230.

However, if the distinguishing characteristic of the current pixel indicates that it should be separated to the second plane 130, flow continues along path 220 to an "add to second buffer" step 222 where the pixel is added to the second buffer. Flow continues, along path 224, to a "put mask in first buffer" step 226 where the mask value for the first plane is written to the first buffer. Flow continues along path 228 to the "increment buffer pointers" step 230.

After separating the pixel to the appropriate plane and masking the other plane, at the "increment buffer pointers" step 230, the pointers to the input buffer, the first buffer, and the second buffer are incremented to point to the next location in each respective buffer. Flow continues along path 232 to a "done" decision 240.

If there are more pixels in the input buffer, flow continues, along path 250, to the "get pixel" step 204 until each pixel has been separated. After all the pixels are separated into their respective planes, flow continues along path 260 to a "compress first buffer" step 262 and then along path 254 to a "compress second buffer" step and then terminates along path 268 at an exit point ("finish") 270.

It would be clear to one skilled in the art that the order of above steps could be changed with the same result. For example, anywhere an action is done with the first buffer and then another action to the second buffer, the steps could be done in the reverse order.

Figure 3:
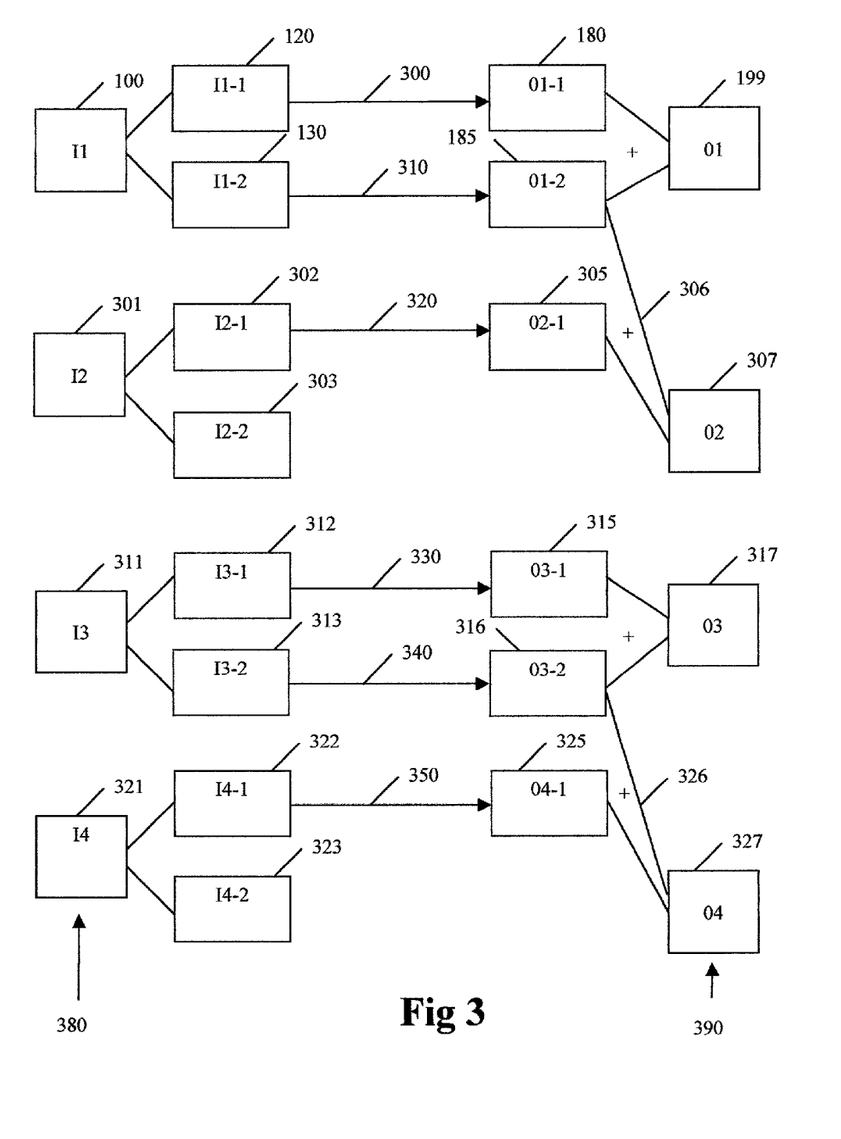
FIG. 3 shows different rates for separated image streams.

FIG. 3

FIG. 3 illustrates an example of how different planes can be decompressed at different frame rates. In this example, four original images: the original image 100, a second original image 301, a third original image 311, and a fourth original image 321, respectively, make up a sequence of video frames, an input video stream 380.

As explained above, the original image 100 (labeled I1) is separated into the first plane 120 (labeled I1-1) and the second plane 130 (labeled I1-2). The first plane 120 is compressed, transferred to storage or across a network, and decompressed as the first decoded image 180 (labeled O1-1). The combined steps of compression, transfer, and decompression are represented by a first transfer 300.

The second plane 130 is compressed, transferred to storage or across a network, and decompressed as the second decoded image 185 (labeled O1-2). The combined steps of compression, transfer, and decompression are represented by a second transfer 310.

The first and second decoded images, 180 and 185 respectively, are combined as explained above to form the combined image 199 (labeled O1).

The second original image 301 (labeled I2) is separated into a second first plane 302 (labeled I2-1) and a second plane 303 (labeled I2-2). The second first plane 302 is compressed, transferred to storage or across a network, and decompressed as a second first decoded image 305 (labeled O2-1). The combined steps of compression, transfer, and decompression are represented by a third transfer 320.

The second plane 303 is not transferred. In the case where the region of the second plane is of less interest to the viewer, this plane of this frame can be skipped (or dropped) to reduce the storage space or network bandwidth required. In the case of Doppler enhanced ultrasound, this plane may have not been changed by the generating circuitry (as explained above) and when the lack of change is detected (by comparing with the data of the previous frame, or by notification from the ultrasound device) this plane of this frame can be skipped. In the general case where encoded color data is more resource intensive than encoded grayscale data, the encoded color data may simply be skipped periodically just to reduce the overall resources required for the video stream.

Because the second plane 303 is not transferred, the second first decoded image 305 (which is newer than the first decoded image 180), is combined with the older second plane data, in this case the second decoded image 185 as shown by a "reuse of second decoded image" path 306. This results in a second combined image 307 (labeled O2).

The second combined image 307 is not necessarily a close representation of the second original image 301 but is a close approximation and will quickly be replaced by a more accurate combined image 317.

A third original image 311 (labeled I3) is handled in the same manner as the original image 100. The third original image 311 is separated into a third first plane 312 (labeled I3-1) and a third second plane 313 (labeled I3-2). The third first plane 312 is compressed, transferred to storage or across a network, and decompressed as a third first decoded image 315 (labeled O3-1). The combined steps of compression, transfer, and decompression are represented by a fourth transfer 330.

The third second plane 313 is compressed, transferred to storage or across a network, and decompressed as a third second decoded image 316 (labeled O3-2). The combined steps of compression, transfer, and decompression are represented by a fifth transfer 340.

The third set of first and second decoded images, 315 and 316 respectively, are combined, as explained above, to form a third combined image 317 (labeled O3).

A fourth original image 321 (labeled I4) is handled in the same manner as the second original image 301. The fourth original image 321 is separated into a fourth first plane 322 (labeled I4-1) and a fourth second plane 323 (labeled I4-2). The fourth first plane 322 is compressed, transferred to storage or across a network, and decompressed as a fourth first decoded image 325 (labeled O4-1). The combined steps of compression, transfer, and decompression are represented by a sixth transfer 350.

The fourth second plane 323 is not transferred, as explained above, regarding the second plane 303.

Because the fourth second plane 303 is not transferred, the fourth first decoded image 325 (which is newer than the third decoded image 315), is combined with the older second plane data, in this case the third second decoded image 316, as shown by a "reuse of third decoded image" path 326. This results in a fourth combined image 327 (labeled O4).

The fourth combined image 327 is not necessarily a close representation of the fourth original image 321 as explained above.

Thus, in this example, an input video stream 380 (comprising frames I1, I2, I3, and I4) is compressed, transferred, and decompressed to an output video stream 390 (comprising frames O1, O2, O3, and O4). However, only six of the eight separated planes are transferred. In some cases, especially when the characteristics of the second plane are resource intensive, this will result in a substantial reduction in the amount of resources required to store or transmit the video stream, without substantially reducing the value or quality of the video stream.

Although not shown in FIG. 3, the present invention teaches that images may be sampled at two independent rates where the first plane is extracted only from images at a first sample rate and the second plane is extracted only from images at a second sample rate. For example, if an ultrasound machine is known to generate the grayscale image at 24 frames per second and to generate the Doppler overlay at 10 frames per second, the grayscale plane can be extracted from the current image 24 times per second, and the color plane can be extracted 10 times a second. It is anticipated that the image generation circuitry of the ultrasound device could signal the image sampler each time the respective images are generated. It is also anticipated that the grayscale base image and the Doppler overlay image could be fed directly into the present invention along the first path 115 and the second path 125 skipping the step normally performed by the ultrasound device that creates the original image 100.

Figure 4A:
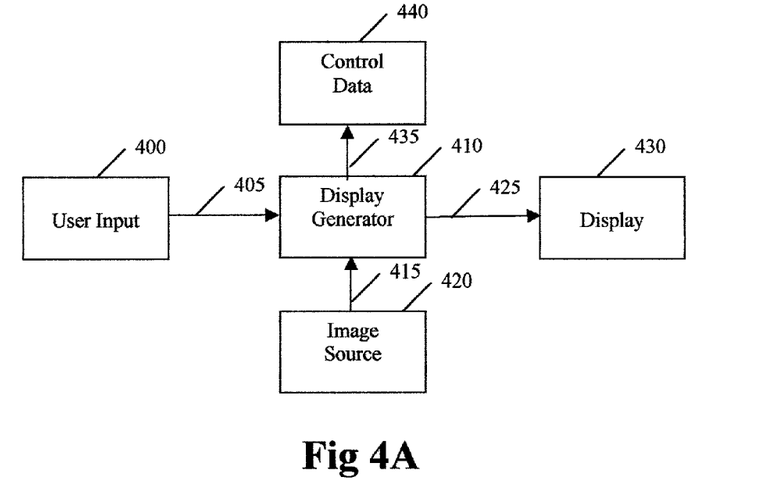
FIG. 4A shows a system for user selection of separation regions.

FIG. 4A

FIG. 4A illustrates a system for user selection of separation regions. In this alternate embodiment of the present invention, the region of the image to be separated is selected by a user input 400. The user could be either a video producer who is compressing a video stream for storage, a viewer who is receiving a video stream at a remote site, a broadcaster who is transmitting a video stream, or similar person who is empowered with the ability to control the plane separation. A system of allowing user input of the separate regions comprises the following:

1. a display 430 which allows the user to see the video and optionally view a selection indicator. The display could show both the uncompressed video and the results of the separation and separate compression methods and frame rates.
2. an image source 420 which provides a stream of multiple original image 100 frames.
3. the user input 400 which allows the user to select one or more regions that are to be separated. The user selection becomes the distinguishing characteristic used in applying the present invention.
4. a display generator 410 that combines the image source 420a with the selection indicator from the user input 400 to drive the display 430. The display generator could also display the results of the separate plane compression method of the present invention.
5. a control data 440 is generated by the display generator 410 based on the user input 400. The control data 440 describes the user's selection. Typically, the control data would be encoded into a protocol understood by the means for separating the planes. For example, if the selection region was a rectangle, the coordinates for opposing corners of the rectangle could be encoded along with the indication that the selection shape was a rectangle.

The user input 400 is connected to the display generator 410 via a user input path 405. Examples of user input 400 devices include keyboards, mice, trackballs, touchpads, touch screens, eye motion sensors, voice commands, and the like. The user input path 405 for each of these types of devices are known in the art.

The image source 420 is connected to the display generator 410 via an image source path 415. The image source path 415 is known in the art, including, but not limited to, composite video, S-Video, DV, mini-DV, video digitizers, USB, FireWire, serial port, parallel port, and the like.

The display 430 is connected to the display generator 410 via a display path 425. Typically the display generator would be a computing device such as a desktop computer or a TV set top box and would be connected to the computer monitor or television set, respectively. The present invention anticipates that there are many embodiments of the display generator and the display including, but not limited to, video phones, satellite TV, cable TV, video conferencing systems, ultrasound machines, weather displays, air traffic control systems, law enforcement systems, military systems, game consoles, and the like.

The control data 440 is generated by the display generator 410, along a control data path 435. If the user is using a single device to compress the video stream, the control data 440 is passed internally to the means for separating the planes. If the user is a remote viewer, as in the video conferencing example, the control data 440 is sent via the network, or the video conferencing connection, to the transmitter where the means for separating the planes is located, allowing the planes to be separated and then compressed and transferred separately.

The user input 400 allows the user to specify the shape, size, or location of the selection region. The user could manipulate the user input 400 to enable and disable the display of a selection indicator. The selection indicator could be the outline of the region is contrasting color. The contrasting color could be a solid color such as red, or it could be filter applied to each pixel of the selection indicator. Examples of filters are inverse (where the inverse color value replaces the pixel), lighten (where each pixel value is made brighter), darken (where each pixel value is made darker), or a similar filter as known in the art.

One user input 400 example of particular interest is the eye motion sensor, because as the video stream is being viewed the eye movement of the user can be immediately detected and used to select the region of interest of the viewer.

FIG. 4B through FIG. 4G

Figure 4B:
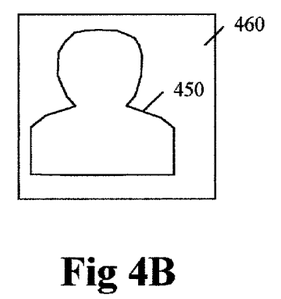
FIGS. 4B through 4G show examples of various selection shapes.

FIGS. 4B through 4G show examples of various selection shapes. FIG. 4B shows a selection shape that matches a human head and shoulders, namely a bust region 450. The bust region 450 is separated into one plane while a background region 460 is separated into another plane.

Figure 4C:
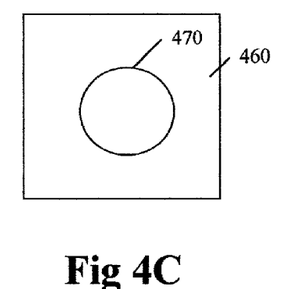

FIG. 4C shows an oval region 470. The oval region 470 is separated into one plane while a background region 460 is separated into another plane.

Figure 4D:
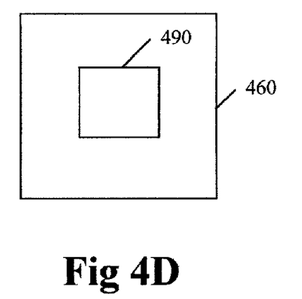

FIG. 4D shows a rectangular region 490. The rectangular region 490 is separated into one plane while a background region 460 is separated into another plane.

Figure 4E:
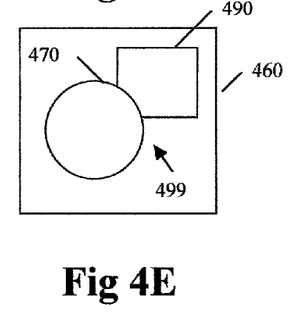

FIG. 4E shows a combined region 499, composed of the union of the oval region 470 and the rectangular region 490. The combined region 499 is separated into one plane while a background region 460 is separated into another plane.

Figure 4F:
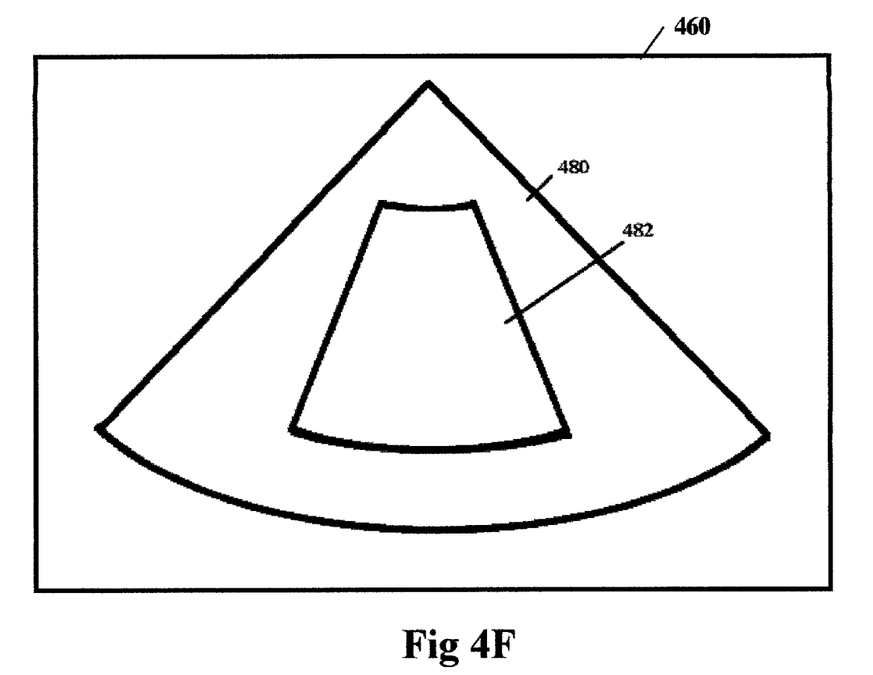

FIG. 4F shows an embodiment using the medical ultrasound image example described above. FIG. 4F shows two selection shapes: an outer region 480 and an inner region 482, enclosed by the outer region 480. The inner region 482 is separated into one plane, the outer region 480 is separated into a second plane (with the inner region masked), and the background region is separated into a third plane (with the outer region and the inner region masked). In this example all three planes could be compressed with separate compression methods and transferred a different rates. For example, the plane corresponding to the background region 460 could be compressed with a lower quality, lossy compression and transferred at 1 frame per second, the plane corresponding to the outer region 480 could be compressed with a lower color depth compression and transferred at 24 frames per second, and the plane corresponding to the inner region 482 could be compressed with a higher quality, lossless compression and transferred at 10 frames per second. When the ultrasound device is in Doppler enhancement mode, the inner region 482 contains the Doppler enhancement and is the region of most interest to the viewer (i.e. the doctor).

In yet another embodiment, after the image is separated in the three regions shown in FIG. 4F, the inner region 482 could be further separated into regions using color depth distinction (as explained in reference to FIG. 1A), resulting in four planes, namely background, outer, inner grayscale, and inner color.

Figure 4G:
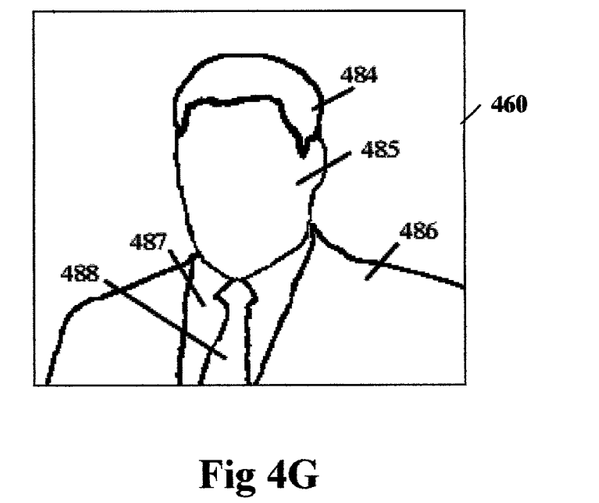

FIG. 4G shows a detailed example of the talking heads (video conferencing, TV interview or TV news broadcast) example described above. Similar to FIG. 4B, the region of interest centers on the bust region 450. However, in FIG. 4F shows an alternative embodiment of the invention where the image is analyzed to identify several regions. Region selection could be based on color similarity such as hair and face tones, based on compressibility, based on edge detection, or another technique known in the art. FIG. 4 shows example regions including: a hair region 484, a face region 485, a coat region 486, a shirt region 487, a tie region 488, and the background region 460. Each region could be separated into separate planes and compressed using separate compression methods that are optimal for the contents of the plane. In the example shown, there could be six separate planes, one for each region. However the coat region 486 and the tie region 488 may be combined into a single plane because they have similar characteristics, in which case, there would be only five planes. Generally, in this example, the face region 485 is the region of most importance to the viewer. In accordance with the present invention the face region 485 could be compressed with a higher quality and transferred at a higher frame rate than the planes corresponding to the other regions.

As explained above, the user could manipulate the user input 400 to select from various predetermined shapes and modify the shape, size, and location of the selected region. The user can also draw a region of any shape. More that one region could be selected. Some embodiments of the present invention will employ multiple selections to separate out three or more planes. All of these selections and how they are displayed on the display 430 can be controlled by the user.

The present invention anticipates that if the area of the selection region is smaller than the entire frame, only the area of the selection region needs to be processed. For example, if the selection region is the rectangular region 490 (shown if FIG. 4D), only the subset rectangle without the surrounding pixels can be compressed and encoded with the relative coordinates of the selection region. The surrounding pixels can be assumed by the decompressor to be mask values.

ADVANTAGES

Optimal Encoding

The present invention provides a method for separating a video image into distinguishable regions. Each region can be encoded, compressed, and transferred in a manner that is optimal for its distinguishing characteristics.

Reduced Size

The present invention reduces the size of an encoded video stream by optimally encoding separated planes. The reduced size saves in the usage and cost of storage devices and computing and networking resources.

Reduced Bandwidth

The present invention reduced the bandwidth required to transfer a compressed video stream. Both transfers within a computer system to a storage device, such as a hard disk, tape drive, and the like, and transfers between a transmitter and a receiver over a network, such as a LAN, the Internet, a television network, and the like, are improved. This improvement comes from: improved compression, separate frame rates for separate planes, and selective frame dropping.

This improved bandwidth allows for the regions of interest to be displayed at a higher quality of resolution and motion while reducing the requirements and cost of a high bandwidth connection or a connection with reduced traffic. For example, the present invention allows a video steam that previously had to be sent over a 1.54 Mb T1 line to be sent over a much less costly and much more prevalent DSL, cable modem, or 56 Kb modem connection.

Efficient Doppler Handling

The present invention provides efficient methods for handling Doppler enhanced images. This allows for lower cost storage of weather, air traffic, and medical images. It also allows for enhanced quality of images.

Automatic Detection of Eye Movement

The present invention provides for automatic detection of the eye movement of a user. This allows for a live television broadcast or webcast to be transmitted using the methods of the present invention.

Automatic Detection of Regions of Interest

The present invention allows for automatic detection of regions of interested based on characteristics of the images, such as color depth, areas of change, external source information, or other distinguishing characteristics.

Automatic Marker Detection

The present invention provides for detection of markers that can be automatically detected to determine regions of greater interest or of improved compressibility. These allow for automatic application of the methods of the present invention. For example, in the case of a broadcast of a sporting event, markers can be used to determine areas of interest so that the important motion of the athletes is preserved when the rate of change normally would prevent a satellite from keeping up with the data. This results in a much more pleasing experience for viewers across the nation.

CONCLUSION, RAMIFICATION, AND SCOPE

Accordingly, the reader will see that the present invention provides a method of distinguishing between regions of an image, separating and masking the original image into multiple image planes, and compressing each separated image plane with a compression method that is optimal for each planes characteristics. From a video stream, separate image streams can be stored or transmitted at different rates.

While my above descriptions contain several specifics these should not be construed as limitations on the scope of the invention, but rather as examples of some of the preferred embodiments thereof. Many other variations are possible. For example, frame differencing may be applied to the input stream to select a subset of a frame to be the original image, or a post processing step could be added to remove artifacts introduced by a particular decompression method.

Accordingly, the scope of the invention should be determined not by the embodiments illustrated, but by the appended claims and their legal equivalents.

I claim:

1. A method for compressing a stream of original video frames comprising the steps of:
   a) selecting a current frame from said stream of original video frame,
   b) distinguishing between regions of the current frame, wherein at least one of said regions is nonrectangular,
   c) separating said current frame into a plurality of image planes, wherein at least one plane contains all of the pixels from said at least one nonrectangular region, and wherein at least one other plane contains none of the pixels from said at least one nonrectangular region,
   d) selecting one of a plurality of distinct compression methods for each of said image planes, wherein the distinct compression method is selected based on the characteristics of the corresponding image plane,
   e) compressing each of said image planes into encoded data using the corresponding distinct compression method,
   f) selecting the next frame from said stream as the current frame, and
   g) repeating steps b) through f) while frames are remaining in the stream,
   whereby the overall compressed size for said stream, namely the combined size of the encoded data for each image plane, is less than the compressed size when each frame of said stream is compressed with a single compression method selected based on the characteristics of the entire stream.

2. The method of claim 1 further comprising a step of transferring said encoded data.

3. The method of claim 2 wherein said encoded data is transferred to a storage device,
   whereby space required to store said encoded data on said storage device is reduced.

4. The method of claim 2 wherein said encoded data is transferred over a network,
   whereby bandwidth required to transmit said encoded data over said network is reduced.

5. The method of claim 2 wherein said encoded data of a first plane is transferred but the said encoded data of a second plane is not transferred.

6. The method of claim 2 further comprising the steps of:
   a) decompressing said encoded data of each of said plurality of said image planes into a decoded image,
   b) combining a plurality of decoded images into a combined image.

7. The method of claim 6 further comprising a step of displaying said combined image.

8. The method of claim 6 wherein said combined image is derived by combining a first decoded image associated with a first plane from a current frame with a second decoded image associated with a second plane from a frame received earlier.

9. The method of claim 1 wherein said distinguishing step is based on a distinguishing characteristic.

10. The method of claim 9 wherein said distinguishing characteristic is the effective color depth of each pixel of said current frame.

11. The method of claim 9 wherein said distinguishing characteristic is based on user selection of a region.

12. The method of claim 11 wherein said user selection is based on user input through an input device.

13. The method claim 12 wherein said user input is detection of user eye movement.

14. The method of claim 9 wherein said distinguishing characteristic is the region of most change between adjacent frames in said video stream.

15. The method of claim 9 wherein said distinguishing characteristic is based on detection of a marker.

16. A computer readable medium encoded with computer executable instructions for performing the method of claim 1.

17. The method of claim 1, wherein said distinguishing step is based on automated analysis.

18. A system for compressing a video stream, said system comprising:
   a) an image source providing said video stream, said video stream comprising a plurality of video frames,
   b) a means for separating each frame into a plurality of planes, wherein at least one plane contains pixels from a region of greater interest and mask pixels having a uniform pixel value, and at least another plane contains pixels from another region of lesser interest, and
   c) a means for compressing each of said plurality of planes into one of a plurality of encoded images, wherein said compressing means comprises a plurality of distinct compression methods, wherein said plane containing the region of greater interest is compressed using a high quality compression method, and wherein said plane containing the region of lesser interest is compressed using a low quality compression method,
   whereby the overall compressed size for said video stream, namely the combined size of the encoded images, is less than the compressed size when each frame of the video stream is compressed with a single high quality compression method.

19. The system of claim 18 further comprising:
   a) a means for transferring some of said plurality of encoded images,
   b) a means for decompressing each of said encoded images into a one or more decoded images,
   c) a means for combining said decoded images into a combined image.

20. The system of claim 19 further comprising:
   a) a user input for controlling a position, a size, and a shape of a selection indicator, b) a display generator wherein said display generator,
   i) changes the position, size, and shape of said selection indicator based on input from a user,
   ii) generates control data based on the current position, size, and shape of said selection indicator, and
   iii) combines a current frame from said video frames with said selection indicator, and
c) a display for displaying said combined current frame and said selection indicator, wherein said means for separating is controlled by control data generated by said display generator, whereby a user specifies the region of greater interest.

21. A computer readable medium encoded with computer executable instructions for performing the system of claim 18.

* * * * *